US012722704B2

(12) United States Patent
Wu et al.

(10) Patent No.: US 12,722,704 B2
(45) Date of Patent: Sep. 1, 2026

(54) ASSEMBLED SLIDING FRAME FOR TRAILER

(71) Applicant: GUANGDONG FUWA HEAVY INDUSTRIES CO., LTD., Jiangmen (CN)

(72) Inventors: Zhiqiang Wu, Jiangmen (CN); Heng Zhang, Jiangmen (CN)

(73) Assignee: GUANGDONG FUWA HEAVY INDUSTRIES CO., LTD., Jiangmen (CN)

( * ) Notice: Subject to any disclaimer, the term of this patent is extended or adjusted under 35 U.S.C. 154(b) by 273 days.

(21) Appl. No.: 18/741,903

(22) Filed: Jun. 13, 2024

(65) Prior Publication Data

US 2025/0074511 A1 Mar. 6, 2025

(30) Foreign Application Priority Data

Sep. 5, 2023 (CN) ........................ 202322398429.8

(51) Int. Cl.
*B62D 21/14* (2006.01)
*B62D 27/02* (2006.01)
*B62D 63/08* (2006.01)

(52) U.S. Cl.
CPC .......... *B62D 21/14* (2013.01); *B62D 27/023* (2013.01); *B62D 63/08* (2013.01)

(58) Field of Classification Search
CPC ....... B62D 21/14; B62D 27/023; B62D 63/08
See application file for complete search history.

(56) References Cited

U.S. PATENT DOCUMENTS

| | | | | |
|---|---|---|---|---|
| 8,899,642 | B2 * | 12/2014 | Kosaka | B60R 19/26 293/133 |
| 9,272,678 | B2 * | 3/2016 | Nam | B62D 25/082 |
| 2016/0176442 | A1 * | 6/2016 | Miyagano | B62D 25/082 296/193.09 |
| 2018/0170437 | A1 * | 6/2018 | Park | B62D 25/082 |
| 2021/0122426 | A1 * | 4/2021 | Friedrich | B62D 29/004 |
| 2022/0097770 | A1 * | 3/2022 | Renn | B60R 19/24 |
| 2023/0264744 | A1 * | 8/2023 | Kim | B62D 21/152 296/204 |
| 2023/0347981 | A1 * | 11/2023 | Colmont | B62D 21/155 |
| 2024/0149949 | A1 * | 5/2024 | Wu | B62D 21/11 |
| 2024/0284865 | A1 * | 8/2024 | Heath | B60P 3/04 |
| 2025/0033702 | A1 * | 1/2025 | Wu | B62D 21/20 |
| 2025/0196936 | A1 * | 6/2025 | Park | B62D 27/065 |
| 2025/0385367 | A1 * | 12/2025 | Fan | H01M 50/249 |

* cited by examiner

*Primary Examiner* — Erez Gurari
(74) *Attorney, Agent, or Firm* — The Webb Law Firm

(57) ABSTRACT

An assembled sliding frame for trailer, including longitudinal beams each including a top wall, a side wall, and a bottom wall, with an opening formed between inner edges of the top wall and the bottom wall; transverse beams each including a top plate, two side plates, a bottom plate, and an end plate. The top plate is fixedly connected to the top wall by a first bolt extending traversely therethrough; brackets each including an outer bracket, an inner bracket, and a connecting base. The outer bracket has a flat portion abutting against an outer surface of the side wall, the flat portion, the side wall and the end plate are fixedly connected by using a second bolt extending traversely therethrough. The inner bracket is fixedly connected with a connecting plate, and the connecting plate is fixedly connected to the bottom plate by using a second bolt extending traversely therethrough.

12 Claims, 5 Drawing Sheets

ASSEMBLED SLIDING FRAME FOR TRAILER

CROSS-REFERENCE TO RELATED APPLICATION

This application claims priority to Chinese Patent Application No. 202322398429.8 filed Sep. 5, 2023, the disclosure of which is hereby incorporated by reference in its entirety.

BACKGROUND

Technical Field

The present disclosure relates to the technical field of vehicles, specifically to an assembled sliding frame for trailer.

Technical Considerations

A sliding frame for trailer is typically installed on the main beams of a trailer to adjust the distance between a suspension system and a towing vehicle, thereby allowing for reasonable distribution of loads to adapt the trailer to different road surfaces. The sliding frame for trailer generally includes two longitudinal beams and several transverse beams connected between the two longitudinal beams. Brackets of the suspension system are fixedly welded to the longitudinal beams. Due to protrusion of the brackets of the suspension system from the lower surfaces of the longitudinal beams and transverse beams, the overall space occupied by the sliding frame is large, making it unsuitable for logistics transportation.

SUMMARY

Aiming at the shortcomings of the existing technology, an objective of the present disclosure is to provide an assembled sliding frame for trailer, which can reduce the space occupied by the sliding frame for trailer during logistics transportation and reduce the transportation cost.

To achieve the above objective, the present disclosure adopts the technical themes as follows.

An assembled sliding frame for trailer including:

longitudinal beams each including a top wall, a side wall formed by bending downward an outer edge of the top wall, and a bottom wall formed by bending inward a bottom of the side wall, with an opening formed between inner edges of the top wall and the bottom wall;

transverse beams each including a top plate, two side plates extending downward from opposite sides of the top plate, a bottom plate located between bottoms of the two side plates and opposite to the top plate, and an end plate connected to ends of the top plate, the two side plates, and the bottom plate, where at least a part of an end of the transverse beam is inserted through the opening of the respective longitudinal beam, and the top plate is fixedly connected to the top wall by a first bolt extending traversely through the top plate and the top wall;

brackets each including an outer bracket arranged on an outer side of the side wall of the respective longitudinal beam, an inner bracket located on an inner side of the outer bracket and arranged opposite to the outer bracket, and a connecting base connected between the inner bracket and the outer bracket, where the outer bracket has a flat portion abutting against an outer surface of the side wall, the flat portion, the side wall and the end plate are fixedly connected by using a second bolt extending traversely through the flat portion, the side wall and the end plate; the inner bracket is fixedly connected with a connecting plate abutting against a lower surface of the bottom plate, and the connecting plate is fixedly connected to the bottom plate by using a second bolt extending traversely through the connecting plate and the bottom plate.

The outer bracket is plate-shaped and is provided with a first reinforcing rib, part of the outer bracket above the first reinforcing rib forms the flat portion.

The outer bracket is provided with a continuous first flange around a periphery of the outer bracket.

The inner bracket is plate-shaped and is provided with wing plates on both sides of a top of the inner bracket extending in a direction away from the outer bracket, and the connecting plate is fixedly connected between the two wing plates.

The inner bracket is provided with a continuous second flange on an edge of the inner bracket between the two wing plates.

Two extension plates which extend upwardly are fixedly connected to the two wing plates respectively, the two extension plates abuts against the two side plates of the transverse beam respectively, and are fixed to the side plates of the transverse beam by fourth bolts extending through the respective extension plates and the respective side plates of the transverse beam.

The extension plates are integrally formed on the respective wing plates, or fixedly welded to the respective wing plates.

The connecting plate is provided with downward-bent first folding edges at both ends of the connecting plate, a downward-bent second folding edge on an inner side of the connecting plate, and a downward-bent third folding edge on an outer side of the connecting plate, two ends of the second folding edge are fixedly welded to the two first folding edges, and the two first folding edges are respectively abutted against inner sides of the two wing plates and fixedly welded to the two wing plates.

The inner bracket is provided with a second reinforcing rib, the third folding edge is provided with a notch into which the second reinforcing rib is inserted.

A connecting wall bending downward from the inner edge of the top wall, and an extension wall bending inward from a bottom of the connecting wall are provided, the extension wall abuts against an upper surface of the top plate of the transverse beam, the first bolt extends transversely through the top plate and the extension wall.

The transverse beam includes two beam units with a C-shaped cross-section, C-shaped openings of the two beam units are arranged opposite to each other, web plates of the two beam units respectively form the two side plates, upper wing plates of the two beam units form the top plate of the transverse beam, and lower wing plates of the two beam units form the bottom plate.

A Z-shaped support plate is arranged between the upper wing plate and the lower wing plate of each of the beam units, a top of the Z-shaped support plate 214 abuts against a lower surface of the respective upper wing plate, and a bottom of the Z-shaped support plate abuts against an upper surface of the respective lower wing plate.

The beneficial effects of the present disclosure are as follows.

In the assembled sliding frame for trailer of the present disclosure, the bolts are used for connecting the brackets with the frame structure formed by the longitudinal beams and the transverse beams, so that the brackets can be fixedly coordinated with the longitudinal beams and the transverse beams, ensuring that the strength of the connection between the brackets and the respective longitudinal and transverse beams meets the requirements for the use of the trailer. Meanwhile, the brackets, the longitudinal beams, and the transverse beams can be separately packaged and transported, reducing the space occupied during the transportation of the sliding frame and lowering the transportation cost.

DETAILED DESCRIPTION

Figure 1:
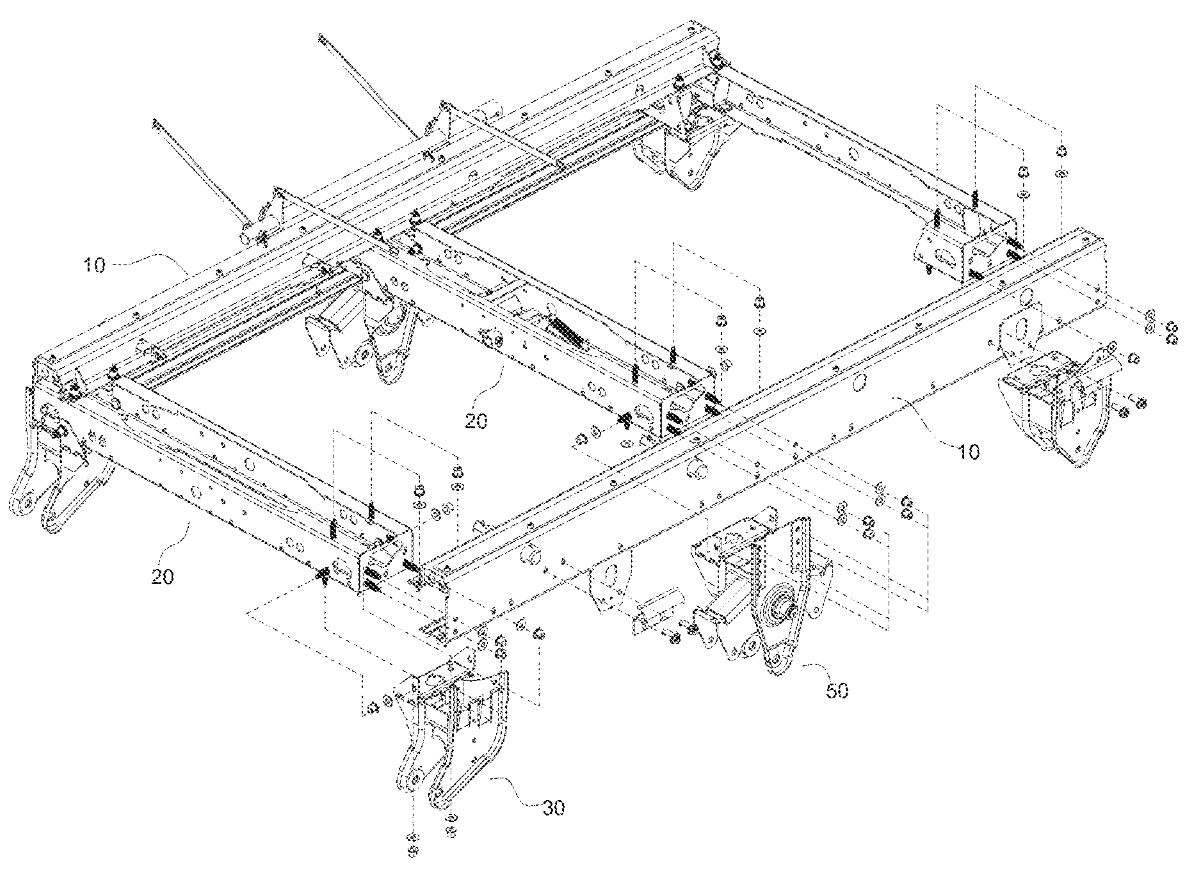
FIG. 1 is a structural schematic view of the present disclosure.
Figure 2:
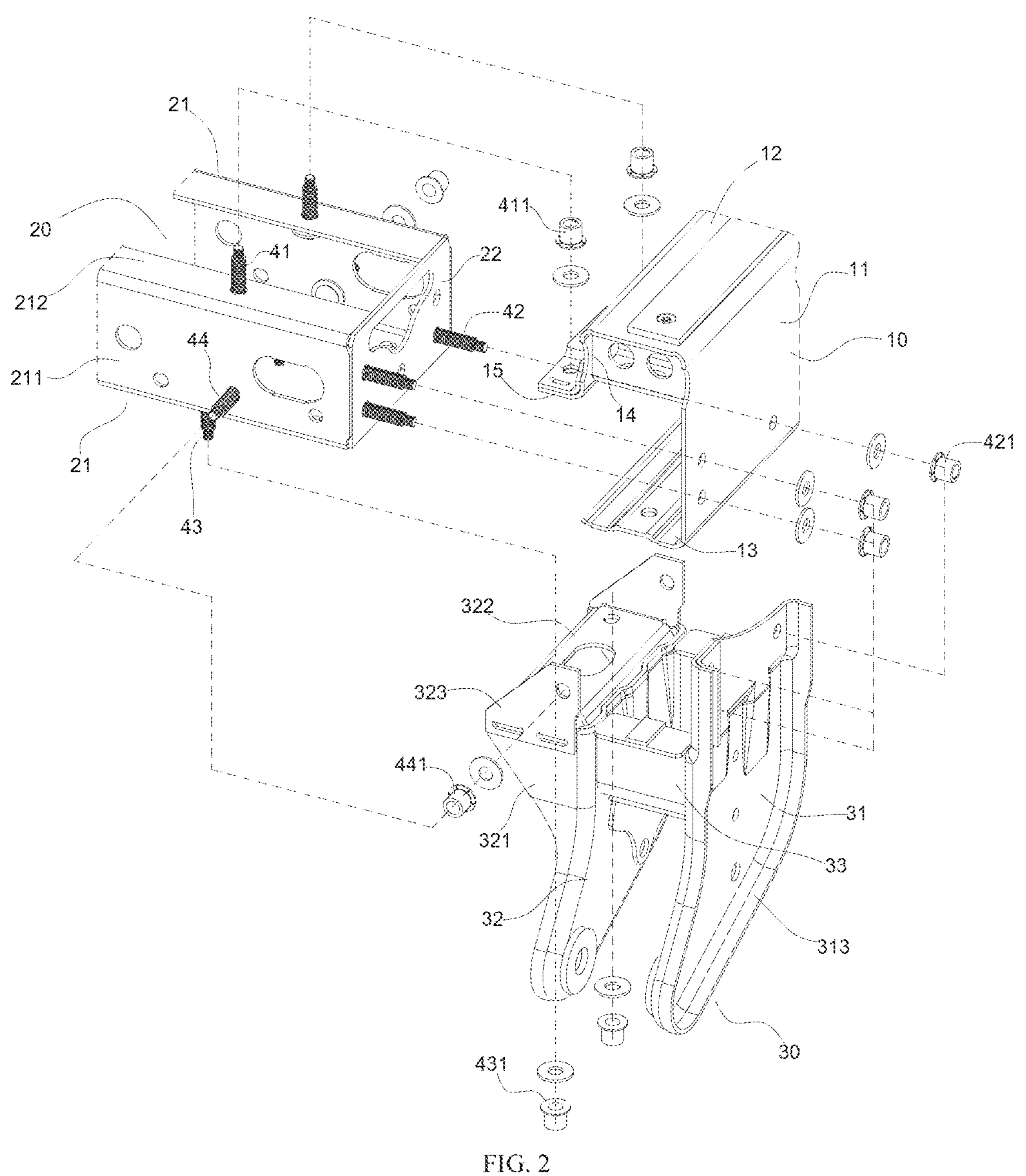
FIG. 2 is a schematic view showing assembly of a sliding frame in FIG. 1.
Figure 3:
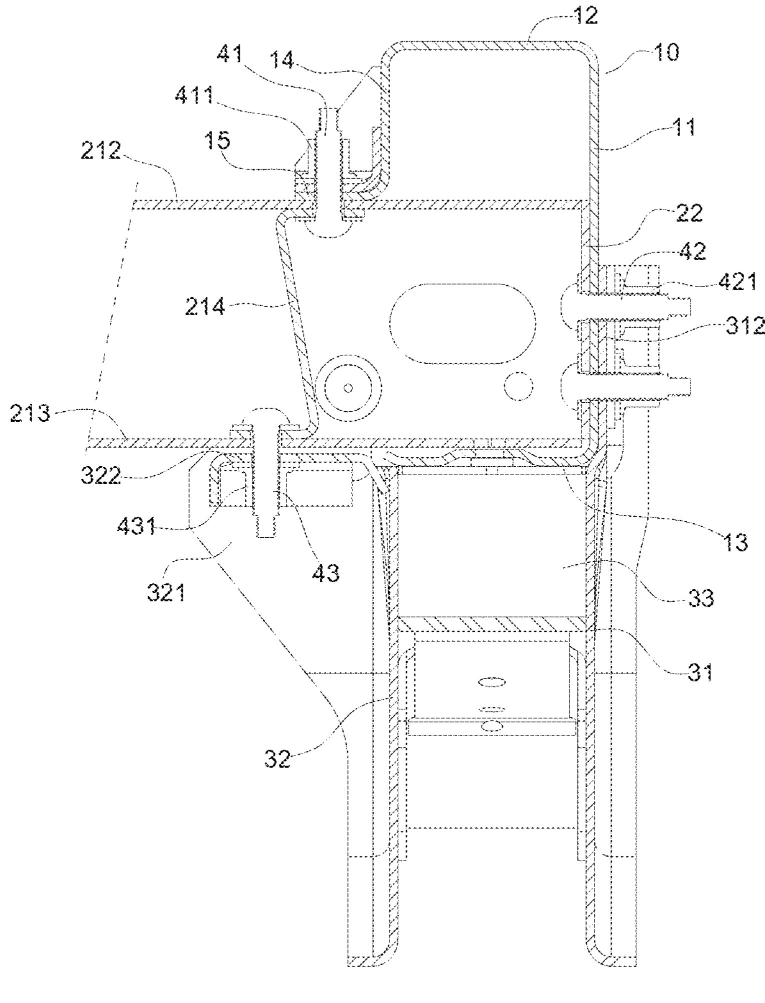
FIG. 3 is a sectional view of the present disclosure.
Figure 4:
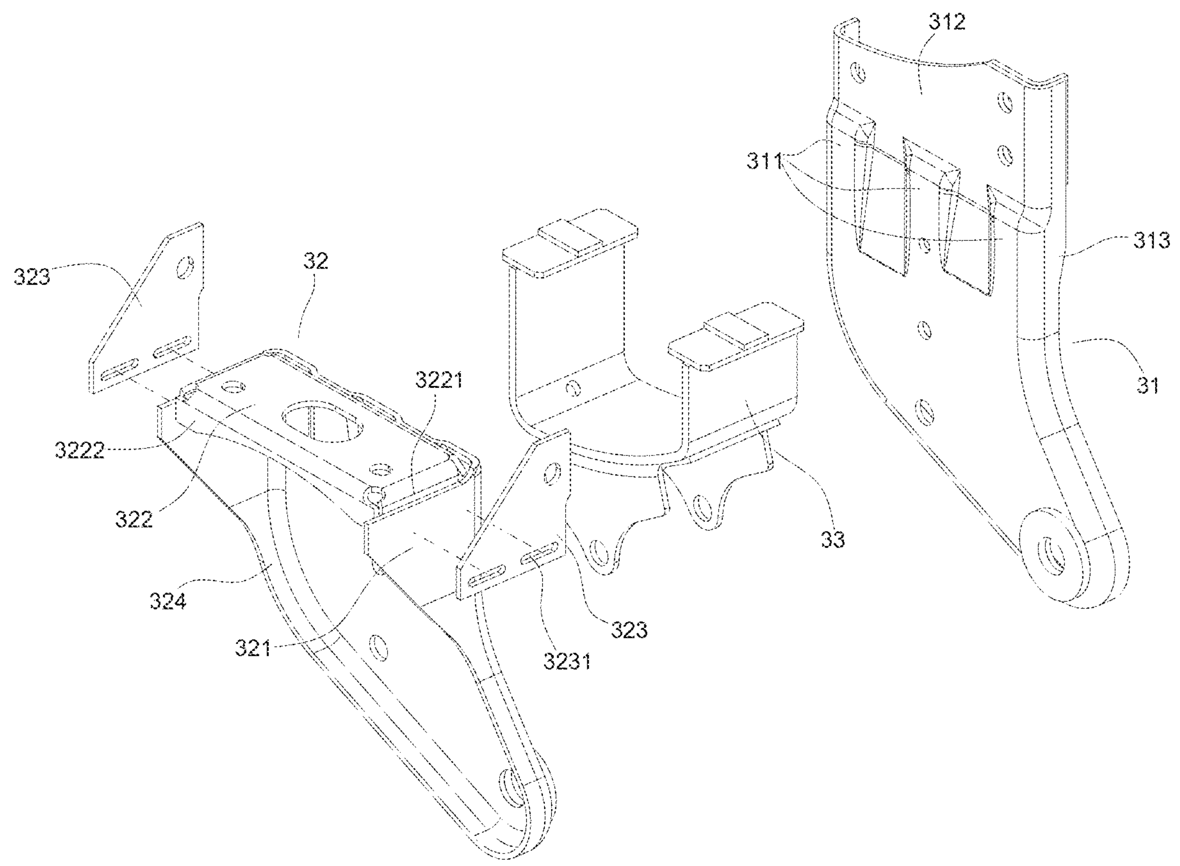
FIG. 4 is a schematic view showing assembly of a bracket in FIG. 2.
Figure 5:
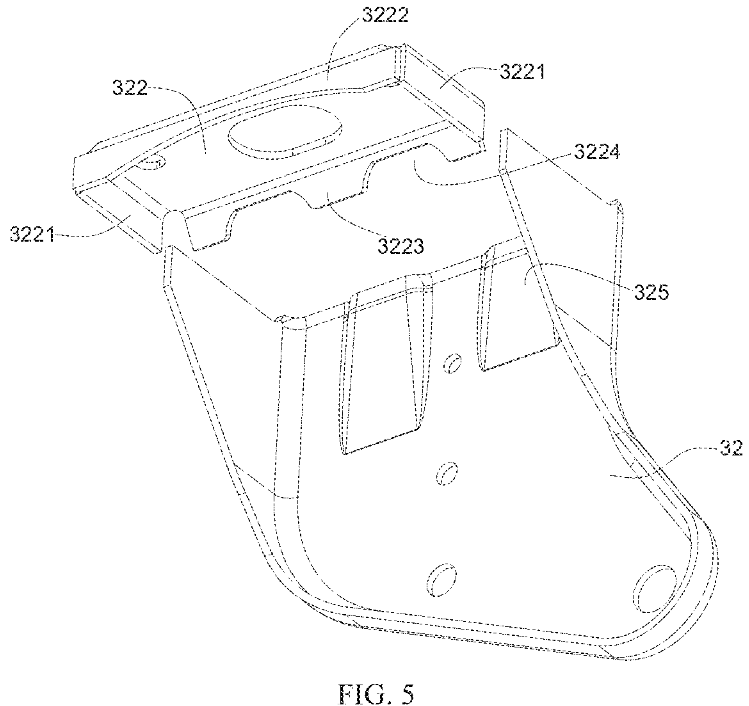
FIG. 5 is a structural schematic view of an inner bracket in FIG. 4.

With reference to the drawings and non-limiting embodiments, the present disclosure is further described below.

As shown in FIGS. 1-5, an assembled sliding frame for trailer of the present disclosure includes two longitudinal beams 10 and three transverse beams 20, forming a frame structure. Brackets 30 and intermediate brackets 50 are installed on the frame structure. The brackets 30 and intermediate brackets 50 are connected to the frame structure formed by the longitudinal beams 10 and the transverse beams 20 via bolts.

Taking installation of one of the brackets 30 with the frame structure as an example, the longitudinal beam 10 includes a top wall 12, a side wall 11, and a bottom wall 13. The side wall 11 is formed by bending downward an outer edge of the top wall 12, and the bottom wall 13 is formed by bending inward a bottom of the side wall 11, forming an opening between inner edges of the top wall 12 and the bottom wall 13. One end of the transverse beam 20 can be inserted into the longitudinal beam 10 through the opening, i.e., at least a part of the end of the transverse beam 20 can be inserted through the opening and arranged between the top wall 12 and the bottom wall 13 of the longitudinal beam 10. The transverse beam 20 specifically includes a top plate, two side plates extending downward from opposite sides of the top plate, a bottom plate located between bottoms of the two side plates and opposite to the top plate, and an end plate 22 connected to ends of the top plate, the two side plates, and the bottom plate. After the transverse beam 20 is fitted with the longitudinal beam 10, the top plate of the transverse beam 20 abuts against a lower surface of the top wall 12, and the bottom plate of the transverse beam 20 abuts against an upper surface of the bottom wall 13. By using a first bolt 41 extending through the top plate of the transverse beam 20 and the top wall 12 of the longitudinal beam 10 from bottom to top, and coordinating with a nut 411 on the first bolt 41, the top plate of the transverse beam 20 is fixedly connected to the top wall 12 of the longitudinal beam 10. The bracket 30 includes an outer bracket 31, an inner bracket 32, and a connecting base 33. The outer bracket 31 is arranged on an outer side of the side wall 11 of the longitudinal beam 10, the inner bracket 32 is located on an inner side of the outer bracket 31 and arranged opposite to the outer bracket 31, with a distance between the inner bracket 32 and the outer bracket 31. The connecting base 33 is arranged between the inner bracket 32 and the outer bracket 31. Both sides of the connecting base 33 are fixedly welded to the inner bracket 32 and the outer bracket 31, respectively, to connect the inner bracket 32 and the outer bracket 31 together. The outer bracket 31 has a flat portion 312 abutting against an outer surface of the side wall 11. By using a second bolt 42 extending transversely from inside to outside through the end plate 22, the side wall 11, and the flat portion 312 successively, and coordinating with a nut 421 on the second bolt 42, the end plate 22, the side wall 11, and the flat portion 312 are fixedly connected together. In addition, a connecting plate 322 is fixedly connected to the inner bracket 32, the connecting plate 322 is arranged below the bottom plate of the transverse beam 20, and an upper surface of the connecting plate 322 abuts against a lower surface of the bottom plate of the transverse beam 20. By using a third bolt 43 extending through the bottom plate of the transverse beam 20 and the connecting plate 322 from top to bottom, and coordinating with a nut 431 on the third bolt 43, the bottom plate of the transverse beam 20 is fixedly connected to the connecting plate 322. In this way, the transverse beam 20 can be fixed to the longitudinal beam 10 by using the first bolt 41, the end plate 22 of the transverse beam 20 can be fixed to the side wall 11 of the longitudinal beam 10 by using the second bolt 42, and the inner bracket 32 can be fixed to the transverse beam 20 by using the third bolt 43.

In the assembled sliding frame for trailer of the present disclosure, the bolts are used for connecting the brackets with the frame structure formed by the longitudinal beams and the transverse beams, so that the brackets can be fixedly coordinated with the longitudinal beams and the transverse beams, ensuring that the strength of the connection between the brackets and the respective longitudinal and transverse beams meets the requirements for the use of the trailer. Meanwhile, the brackets, the longitudinal beams, and the transverse beams can be separately packaged and transported, reducing the space occupied during the transportation of the sliding frame and lowering the transportation cost.

The outer bracket 31 is plate-shaped, with a first reinforcing rib 311 arranged thereon. The first reinforcing rib 311 may be formed on the outer bracket 31 by stamping. Part of the outer bracket 31 above the first reinforcing rib 311 forms the flat portion 312. By arranging the flat portion 312 on the outer bracket 31, the outer bracket 31 can be better abutted against the outer surface of the side wall 11. Consequently, multiple second bolts 42 can extend through the flat portion 312 to increase the connection strength between the outer bracket 31 and the longitudinal beam 10. Additionally, by arranging the part above the first reinforcing rib 311 as the flat portion 312, and abutting the flat portion 312 against the outer side of the side wall 11, a top of the first reinforcing rib 311 is positioned exactly at a chamfer where the side wall 11 and the bottom wall 13 are joined. This coordination between the first reinforcing rib 311 and the chamfer helps position the outer bracket 31 and the longitudinal beam 10, while the first reinforcing rib 311 also supports the chamfer, contributing to the overall stability of the sliding frame. To enhance the strength of the outer bracket 31, continuous first flanges 313 are arranged around a periphery of the outer bracket 31, forming a reinforcing rib around the periphery of the outer bracket 31 to increase the strength of the outer bracket 31.

The inner bracket 32 is plate-shaped, with wing plates 321 on both sides of a top of the inner bracket 32 extending in a direction away from the outer bracket 31. The connecting plate 322 is fixedly connected between the two wing plates 321. The connecting plate 322 may be fixedly connected to the wing plates 321 by welding. Continuous second flanges 324 are arranged on an edge of the inner bracket 32 between the two wing plates 321. The inner bracket 32 may be formed by stamping, during which the wing plates 321 and the second flanges 324 are formed. The second flanges 324 form a reinforcing rib around the periphery of the inner bracket 32 to increase the strength of the inner bracket 32. To allow the wing plates 321 to be fixedly connected to both sides of the transverse beam 20, extension plates 323 which extend upwardly are fixedly connected to the wing plates 321 respectively. The extension plates 323 extend upward from respective top edges of the wing plates 321 and are arranged on respective sides of the transverse beam 20. The two extension plates 323 abuts against the two side plates of the transverse beam 20 respectively, and are fixed to the side plates of the transverse beam 20 by fourth bolts 44 extending through the respective extension plates 323 and the respective side plates of the transverse beam 20. Each of the fourth bolts 44 extends from the inside of the transverse beam 20 through the side plate of the transverse beam 20 and into the respective extension plate 323 on an outer side of the side plate. A nut 441 on the fourth bolt 44 cooperates with the fourth bolt 44 to secure the side plate of the transverse beam 20 to the extension plate 323. The extension plates 323 are fixed to the wing plates 321 by welding. Specifically, an elongated through-hole 3231 is formed in each of the extension plates 323, with part of the extension plate 323 containing the through-hole 3231 abutting against an outer side of the wing plate 321. Welding is performed along the periphery of the through-hole 3231 to weld the extension plate 323 to the wing plate 321. In other non-limiting embodiments, the extension plates 323 may also be integrally formed on the respective wing plates 321.

The connecting plate 322 is provided with downward-bent first folding edges 3221 at both ends of the connecting plate 322, a downward-bent second folding edge 3222 on an inner side of the connecting plate 322, and a downward-bent third folding edge 3223 on an outer side of the connecting plate 322. Two ends of the second folding edge 3222 are fixedly welded to the two first folding edges 3221, forming a box-like structure for the connecting plate 322 to increase its strength. Moreover, the two first folding edges 3221 are respectively abutted against inner sides of the two wing plates 321 and fixedly welded to the wing plates 321. Due to downward-extending first folding edges 3221 at both ends of the connecting plate 322, the connecting plate 322 and the wing plates 321 can be fixedly welded by overlapping, simplifying the welding process. The inner bracket 32 is provided with a second reinforcing rib 325 protruding from an inner surface of the inner bracket 32. The third folding edge 3223 is provided with a notch 3224. After the connecting plate 322 is placed between the two wing plates 321, the second reinforcing rib 325 is inserted into the notch 3224. The second reinforcing rib 325 reinforces the inner bracket 32, and the coordination between the second reinforcing rib 325 and the notch 3224 in the third folding edge 3223 helps position the connecting plate 322.

The longitudinal beam 10 is provided with a connecting wall 14 bending downward from the inner edge of the top wall 12, and an extension wall 15 bending inward from a bottom of the connecting wall 14. The extension wall 15 is parallel to the top wall 12 and abuts against an upper surface of the top plate of the transverse beam 20. The first bolt 41 extends transversely from bottom to top through the top plate of the transverse beam 20 and the extension wall 15 of the longitudinal beam 10, fixing the transverse beam 20 to the longitudinal beam 10. By providing the connecting wall 14 and the extension wall 15 on the top wall 12, an inverted G-shaped cross-section for the longitudinal beam 10 can be formed. Of course, in other non-limiting embodiments, the cross-section of the longitudinal beam 10 may also be C-shaped.

The transverse beam 20 includes two beam units 21, with a C-shaped cross-section, respectively. The C-shaped openings of the two beam units 21 are arranged opposite to each other. The end plate 22 is connected to ends of the two beam units 21, respectively. Each of the beam units includes a web plate 211, an upper wing plate 212, and a lower wing plate 213. The web plates 211 of the two beam units 21 respectively form the side plates of the transverse beam 20, the upper wing plates 212 of the two beam units 21 form the top plate of the transverse beam 20, and the lower wing plates 213 of the two beam units 21 form the bottom plate of the transverse beam 20. Since the transverse beam 20 includes two beam units 21, when the inner bracket 32 is fixed to the transverse beam 20, the first bolt 41, the second bolt 42, the third bolt 43, and the fourth bolt 44 can extend out of the transverse beam 20 from the inside of the transverse beam 20, facilitating the installation of bolts during assembly and tightening the nuts on the bolts on the outside of the transverse beam. Additionally, a Z-shaped support plate 214 is arranged between the upper wing plate 212 and the lower wing plate 213 of each of the beam units 21. A top of the Z-shaped support plate 214 abuts against a lower surface of the upper wing plate 212, and a bottom of the Z-shaped support plate 214 abuts against an upper surface of the lower wing plate 213. The first bolt 41 extends transversely from bottom to top through the top of the Z-shaped support plate 214, the upper wing plate 212, and the extension wall 15 on the top wall 12 of the longitudinal beam 10. Then, the nut 411 is tightened on the part of the first bolt 41 protruding from the extension wall 15 to secure the first bolt 41. The third bolt 43 extends transversely from top to bottom through the bottom of the Z-shaped support plate 214, the lower wing plate 213, and the connecting plate 322 in sequence. Then, the nut 431 is tightened on the part of the third bolt 43 protruding from a lower surface of the connecting plate 322 to secure the third bolt 43.

The connection method between the intermediate brackets 50 and the longitudinal beam 10 and the transverse beam 20 in FIG. 1 is the same as the connection method of the bracket 30 described above, and is not repeated here.

The above embodiments are only used to illustrate the technical theme of the present disclosure, rather than limiting the present disclosure. Although the present disclosure has been described in detail with reference to the above embodiments, those of ordinary skills in the art should appreciate that the technical themes described in the above embodiments may be modified, or some of the technical features therein may be replaced equivalently. Such modifications or replacements do not depart from the essence of the technical themes of the embodiments of the present disclosure.

What is claimed is:

1. An assembled sliding frame for trailer, comprising:

longitudinal beams each comprising a top wall, a side wall formed by bending downward an outer edge of the top wall, and a bottom wall formed by bending inward a bottom of the side wall, with an opening formed between inner edges of the top wall and the bottom wall;

transverse beams each comprising a top plate, two side plates extending downward from opposite sides of the top plate, a bottom plate located between bottoms of the two side plates and opposite to the top plate, and an end plate connected to ends of the top plate, the two side plates, and the bottom plate, wherein at least a part of an end of the transverse beam is inserted through the opening of the respective longitudinal beam, and the top plate is fixedly connected to the top wall by a first bolt extending traversely through the top plate and the top wall; and brackets each comprising an outer bracket arranged on an outer side of the side wall of the respective longitudinal beam, an inner bracket located on an inner side of the outer bracket and arranged opposite to the outer bracket, and a connecting base connected between the inner bracket and the outer bracket, wherein the outer bracket has a flat portion abutting against an outer surface of the side wall, the flat portion, the side wall and the end plate are fixedly connected to each other by a second bolt extending traversely through the flat portion, the side wall and the end plate; the inner bracket is fixedly connected with a connecting plate abutting against a lower surface of the bottom plate, and the connecting plate is fixedly connected to the bottom plate by a second bolt extending traversely through the connecting plate and the bottom plate.

2. The assembled sliding frame for trailer of claim 1, wherein the outer bracket is plate-shaped and is provided with a first reinforcing rib, part of the outer bracket above the first reinforcing rib forms the flat portion.

3. The assembled sliding frame for trailer of claim 2, wherein the outer bracket is provided with a continuous first flange around a periphery of the outer bracket.

4. The assembled sliding frame for trailer of claim 1, wherein the inner bracket is plate-shaped and is provided with wing plates on both sides of a top of the inner bracket extending in a direction away from the outer bracket, and the connecting plate is fixedly connected between the two wing plates.

5. The assembled sliding frame for trailer of claim 4, wherein the inner bracket is provided with a continuous second flange on an edge of the inner bracket between the two wing plates.

6. The assembled sliding frame for trailer of claim 4, wherein two extension plates which extend upwardly are fixedly connected to the two wing plates respectively, the two extension plates abuts against the two side plates of the transverse beam respectively, and are fixed to the side plates of the transverse beam by fourth bolts extending through the respective extension plates and the respective side plates of the transverse beam.

7. The assembled sliding frame for trailer of claim 6, wherein the extension plates are at least one of the following: integrally formed on the respective wing plates, fixedly welded to the respective wing plates, or any combination thereof.

8. The assembled sliding frame for trailer of claim 4, wherein the connecting plate is provided with downward-bent first folding edges at both ends of the connecting plate, a downward-bent second folding edge on an inner side of the connecting plate, and a downward-bent third folding edge on an outer side of the connecting plate, two ends of the second folding edge are fixedly welded to the two first folding edges, and the two first folding edges are respectively abutted against inner sides of the two wing plates and fixedly welded to the two wing plates.

9. The assembled sliding frame for trailer of claim 4, wherein the inner bracket is provided with a second reinforcing rib, and the third folding edge is provided with a notch into which the second reinforcing rib is inserted.

10. The assembled sliding frame for trailer of claim 1, wherein a connecting wall bending downward from the inner edge of the top wall, and an extension wall bending inward from a bottom of the connecting wall are provided, the extension wall abuts against an upper surface of the top plate of the transverse beam, the first bolt extends transversely through the top plate and the extension wall.

11. The assembled sliding frame for trailer of claim 1, wherein the transverse beam comprises two beam units with a C-shaped cross-section, C-shaped openings of the two beam units are arranged opposite to each other, web plates of the two beam units respectively form the two side plates, upper wing plates of the two beam units form the top plate of the transverse beam, and lower wing plates of the two beam units form the bottom plate.

12. The assembled sliding frame for trailer of claim 11, wherein a Z-shaped support plate is arranged between the upper wing plate and the lower wing plate of each of the beam units, a top of the Z-shaped support plate abuts against a lower surface of the respective upper wing plate, and a bottom of the Z-shaped support plate abuts against an upper surface of the respective lower wing plate.

* * * * *